Figure 1:
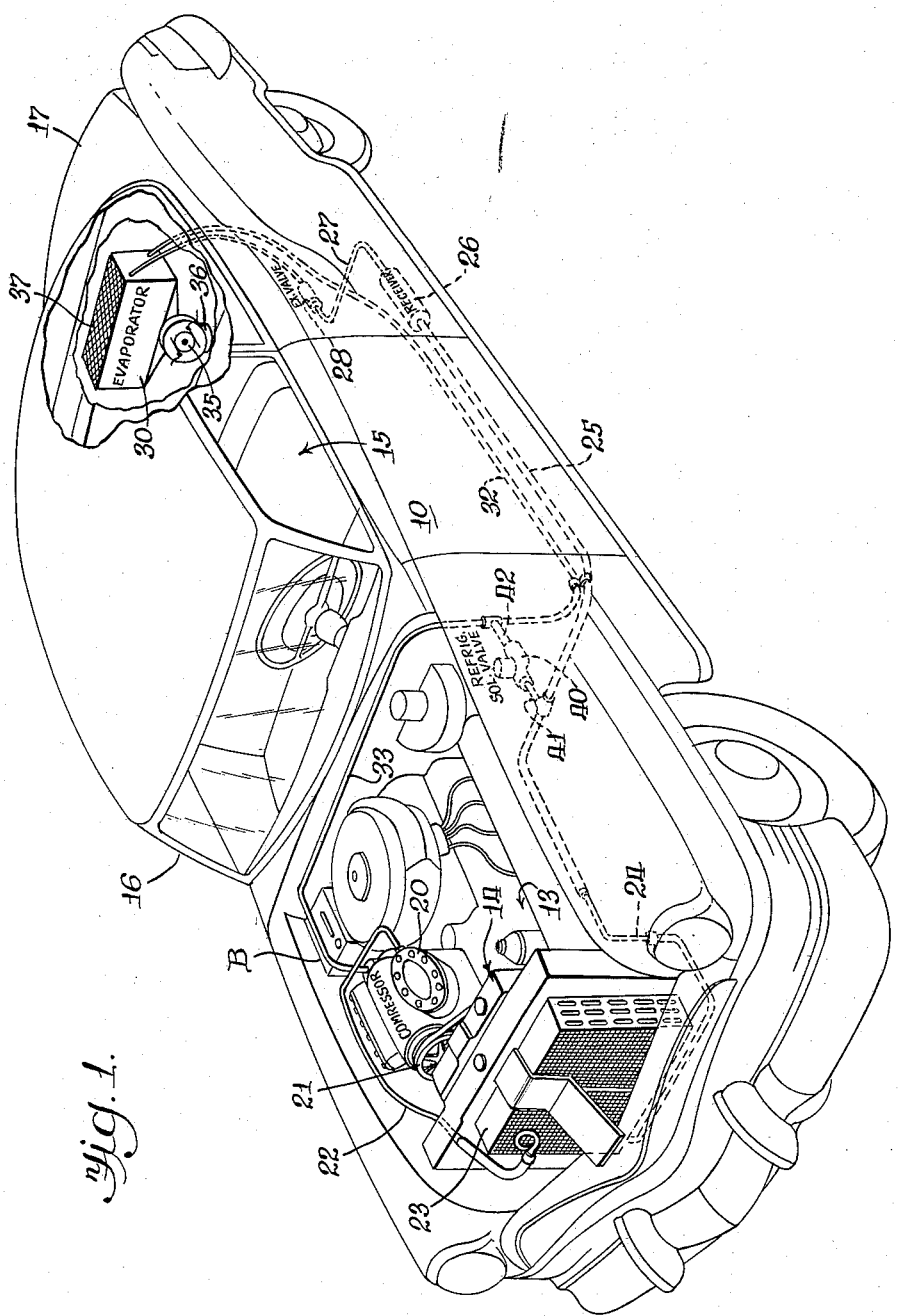

Sept. 27, 1955  E. H. BURGESS ET AL  2,718,763
SPACE COOLING SYSTEMS FOR AUTOMOBILES
Filed Feb. 25, 1953  2 Sheets-Sheet 1

INVENTORS.
Everett H. Burgess
Ira S. Hardner
George M. Egart
By Harvey M. Gillespie Atty.

Sept. 27, 1955  E. H. BURGESS ET AL  2,718,763
SPACE COOLING SYSTEMS FOR AUTOMOBILES
Filed Feb. 25, 1953  2 Sheets-Sheet 2
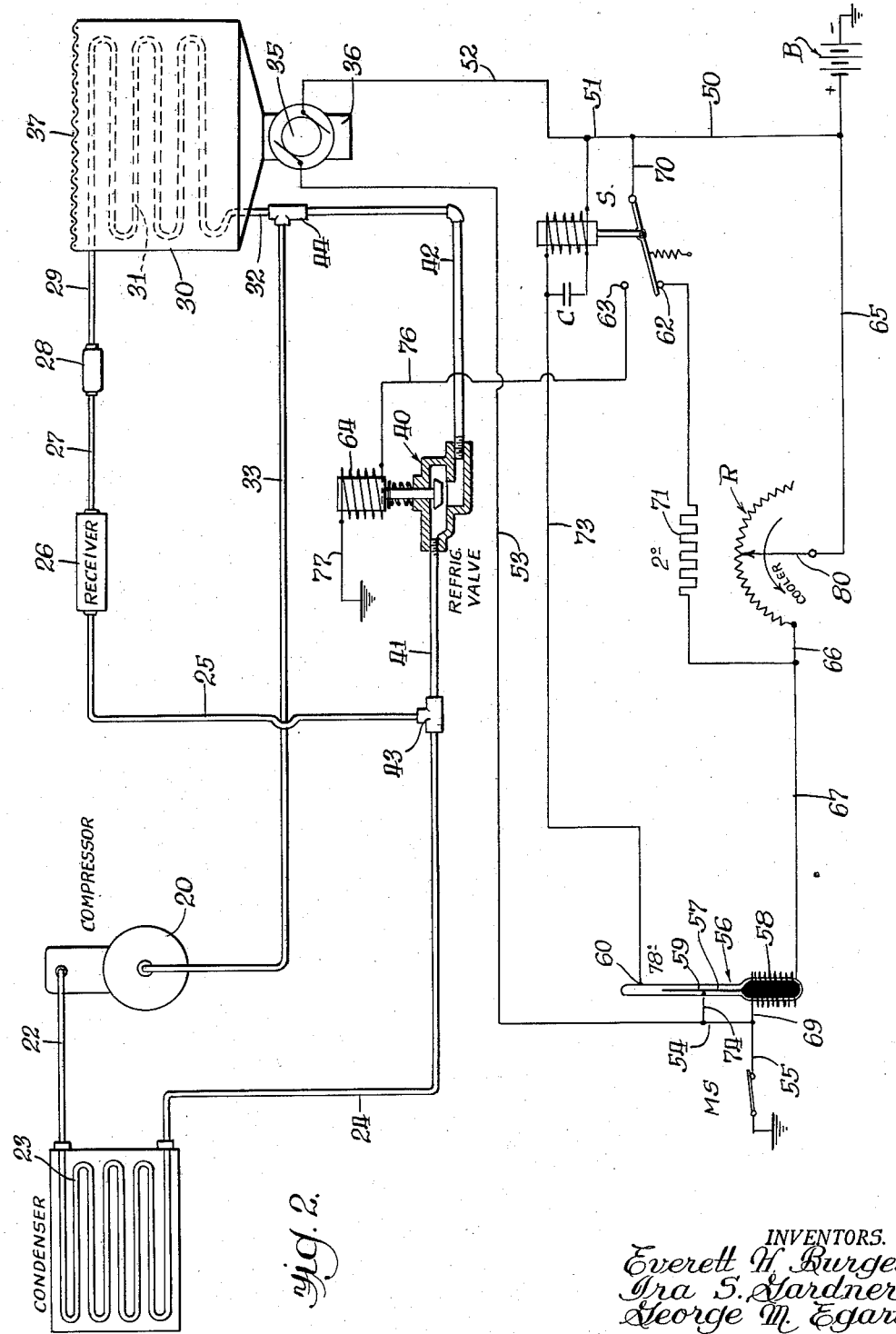
INVENTORS.
Everett H. Burgess
Ira S. Gardner
George M. Egart
By Harvey M. Gillespie Atty.

United States Patent Office 2,718,763
Patented Sept. 27, 1955

2,718,763

SPACE COOLING SYSTEMS FOR AUTOMOBILES

Everett H. Burgess, Elmwood Park, Ira S. Gardner, New Lennox, and George M. Egart, Park Ridge, Ill., assignors to Vapor Heating Corporation, Chicago, Ill., a corporation of Delaware Application February 25, 1953, Serial No. 338,858

2 Claims. (Cl. 62—3)

The present invention relates to space cooling systems for automobiles and more particularly to improved means for controlling the effectiveness of such cooling system and thereby regulate the temperature of the passenger space of the vehicle.

Air cooling systems for motor vehicles heretofore used or proposed have ordinarily included conventional air cooling apparatus comprising a compressor for withdrawing a gaseous coolant from a conventional evaporator or air cooler and for delivering the compressed coolant into a condenser. Thereafter the compressed coolant is delivered in controlled amounts into the evaporator wherein it expands and thereby cools a stream of air which is caused to pass in heat exchanging relation with the evaporator.

The principal object of the invention includes the provision of a simplified control system for air cooling apparatus of the above character whereby a more satisfactory control of the temperature of the passenger space may be maintained by permitting continuous operation of the compressor and at the same time vary the effectiveness of the evaporator or air cooler so as to obtain the desired regulation of the temperature within the passenger space.

Another object is to provide a control system of the above character in which the temperature to be maintained within the passenger compartment of an automobile may be selectively regulated by automatic manipulation of a single control instrument associated with the coolant circulation system to vary the effectiveness of the air cooler.

Still another object of the invention is to provide electrical control means for air cooling apparatus of the above character, which control means consists of only three electrical assemblies or instrumentalities, namely a thermostat assembly including an electrical auxiliary heater therefor, a relay assembly, and a control rheostat, these assemblies being suitably connected electrically and so related in the system as to control the opening and closing movements of a solenoid valve associated with the air cooling apparatus and by means of which the supply of refrigerant is conducted to or by-passed around the evaporator of said apparatus to vary the effectiveness of said evaporator and thereby control the temperature of the air being recirculated in the passenger compartment.

Other objects and advantages of the invention, not at this time enumerated, will become more readily apparent as the nature of the invention is better understood.

In the accompanying two sheets of drawings forming a part of this specification, a preferred embodiment of the invention has been shown.

In these drawings:

Fig. 1 is a perspective view, somewhat schematic in its representation, of an automobile equipped with means for delivering cooled air into the passenger compartment thereof and showing the improved control system applied thereto, and Fig. 2 is a diagrammatic view of the air cooling and circulating apparatus and showing the circuit diagram for the electrical control system.

In the illustrated embodiment of the invention shown, the automobile, generally designated at 10 in Fig. 1 and shown in phantom outlines, may be of any standard make or model and includes the usual equipment of which the engine assembly 12 within the engine compartment 13, the radiator 14 for cooling the engine coolant fluid, the electrical battery B, the passenger compartment 15 within the car body 16, and the luggage compartment 17 at the rear of the vehicle, are noteworthy in connection with the present invention.

The air cooling apparatus involves in its general organization a refrigerant compressor 20 (Figs. 1 and 2) which is adapted to be driven in any suitable manner from the motor shaft (not shown) as for example by means of a belt and pulley arrangement 21 in which the belt may pass over the usual water pump pulley (not shown) associated with the engine. The discharge side of the compressor 20 is connected through a conduit 22 to the inlet side of a condenser 23 in which the heat is dissipated from the compressed gaseous coolant. The outlet side of the condenser 23 is connected through conduit sections 24, 25, receiver 26, and conduit section 27 to an expansion valve 28 which restricts the passage of the compressed coolant and in turn is connected through conduit section 29 to the inlet side of evaporator or air cooler 30 having the usual refrigerant coils 31 in which the coolant expands or evaporates from a highly compressed state into a more rarefied gas. The outlet side of the evaporator 30 is connected through conduit sections 32 and 33 in the inlet side of the compressor 20.

From the above description it will be seen that a closed refrigerant path is provided for the refrigerant associated with the air cooling apparatus and that expended gaseous refrigerant placed under compression by the compressor 20 is passed to the condenser 23 where it gives up a considerable portion of its heat and is from thence conducted through the receiver 26 to the expansion valve 25 where it is allowed to expand into a more rarefied gaseous state accompanied by a marked and sudden temperature drop within the coils 31 of the evaporator 30 and is utilized to cool the air passing in heat exchanging relation with said coils. The expanded gas is then returned to the compressor through the conduits provided for it.

As shown in Fig. 2, the evaporator has associated therewith a circulating fan 35 by means of which the air existing within the enclosure 15 or within the trunk 17 may be withdrawn therefrom through conduit 36 and circulated through the evaporator and thereafter discharged from grill 37 into the enclosure 15.

According to the present invention, the passage of coolant gas to the evaporator 30 may be regularly interrupted to vary the effectiveness of the evaporator. This result is accomplished by means of a by-pass valve 40 disposed in a by-pass conduit including two conduit sections 41 and 42, the former leading from a T-fitting 43 at the juncture between the conduit sections 24 and 25 and the latter leading from a T-fitting 44 at the juncture between the conduit sections 32 and 33. The valve 40 is of the normally open solenoid controlled type and thus it will be seen that with the valve 40 open as shown in Fig. 2, the normal path of least resistance for the refrigerant will be from the compressor 20, through the conduit section 22, condenser 23, conduit sections 24 and 41, valve 40, conduit sections 42 and 33 to the compressor. Fluid passing through the circuit just described is thus by-passed around the expansion valve 28 and evaporator 30 and when this condition obtains, the refrigerant is excluded from the evaporator so that the latter will discontinue its air cooling function and air entering the passenger compartment from the compartment 17 through the evaporator will not be refrigerated. When the valve 40 is closed, the path for the refrigerant will be as previously described through the expansion valve 28 and evaporator coils 31.

Referring now to Fig. 2 wherein the electrical control system of the present invention is diagrammatically illustrated, the circuit for the fan 35 is adapted to become energized whenever the main control or master switch MS is closed. This circuit for the fan 35 extends from the positive side of the battery through leads 50, 51, 52, fan 35, leads 53, 54, 55, and switch MS to ground. The fan 35 is thus operated at all times as long as the main switch MS remains closed.

A control thermostat 56 having a mercury column 57 and an auxiliary heater 58 surrounding the column 57 is disposed within the passenger compartment 15 at a suitable location therein. The thermostat is provided with a pair of contacts 59 and 60, the latter being engageable by the column 57 when the thermostat registers a selected temperature, for example 78° F. and the former contact being sufficiently low along the column 57 as to be engageable at an appreciably lower temperature. The system further includes a variable rheostat R, a relay switch S having a normally closed contact 62, and a normally open solenoid contact 63. The normally open valve 40 is provided with a control solenoid 64.

When the control switch MS is closed and the system is in operation, if the temperature within the passenger compartment is below the selected temperature setting of thermostat 56, a circuit will exist from the battery B through lead 65, resistor R, leads 66, 67, auxiliary heater 58, leads 69, 55, and main switch MS to ground. Simultaneously a parallel circuit will extend from the battery through leads 50, 70, contacts 62 of the switch S, metered resistor 71, lead 67, heater 58, leads 69, 55 and switch MS to ground. The auxiliary heat generated in the heater 58 will augment the normal reading of the mercury column 57, but if the ambient temperature of the thermostat 56 is below the functional setting of the thermostat as established by the rheostat R, energization of the control system will be confined to the heater circuits just described.

If upon initial closure of the switch MS, the ambient temperature is above the functional setting of the thermostat 56, the mercury column 57 will bridge the contacts 59 and 60 and a circuit will exist from the battery B through leads 50, 51, relay winding lead 73, contacts 60, 59, leads 74, 54, 55 and switch MS to ground. Consequent energization of the relay winding shifts the contacts 62 and 63 and closure of the normally open contacts 63 establishes a circuit extending from the battery B through leads 50, 70, contacts 63, lead 76, solenoid 64 and lead 77 to ground. A condenser C is connected in shunt with the winding of said relay.

Energization of the solenoid 64 through the circuit just described serves to close the normally open valve 40 and, as previously described, coolant fluid is obliged to follow the circuit provided for it through the expansion valve 28 and the resultant coolant gas is conducted through the evaporator 30 for air cooling purposes.

Opening of the contacts 62 serves to discontinue the flow of current through the metered resistor 71 and thus lower the amount of current flowing through the auxiliary heater 58 by limiting this current flow to that flowing through the rheostat R. As the temperature within the passenger compartment 15 becomes lowered as a result of such admission of cooled air thereinto, a condition of ambient temperature at the thermostat 56 may obtain wherein the mercury column 57 descends below the contact 60 and opens the previously described circuit through the winding of relay S. At such time the relay contact 62 is closed upon de-energization of the relay and the contact 63 thereof is opened and the previously described condition of the control system wherein the solenoid 64 is de-energized and the valve 40 assumes its normally open condition will obtain. When such a condition exists the coolant fluid will be by-passed through the fluid circuit including the compressor 20 and condenser 23 but excluding the expansion valve 28 and evaporator 30.

The rheostat R is provided with a movable sliding contact arm 80 which, when moved in a counterclockwise direction as viewed in Fig. 2, decreases the amount of effective resistance through the resistor and allows increased current to flow in the auxiliary heater 58 and thereby lowers the functional setting of the thermostat contact 60. Conversely, the contact arm 80, when moved in a clockwise direction, decreases the current flow to the auxiliary heater and thereby raises the functional setting of the thermostat contact 60.

Assuming that the system is set into operation when the temperature within the passenger compartment is extremely hot, say 100° F. (which is not unusual if the car has remained in the sun for a period of time), closure of the main switch MS will close an energizing circuit through the winding of relay S and thereby close the relay contact 63 to establish an energizing circuit through solenoid 64 so as to close the by-pass valve 40. The air cooler 30 will immediately commence to function and cooled air will be introduced into the passenger compartment 15 to cool the same. This cooling effect will be continuous as long as the contacts 59 and 60 remain bridged. However, as soon as the thermostat circuit breaks at said contact 60, the winding of relay S is de-energized and thereby permits the relay contact 62 to close a circuit through the resistor 71 to add approximately 2° of additional heat to the auxiliary heater 58, thereby causing the mercury column 57 to reengage the thermostat contact 60, and thereby re-energize relay S to close contact 63 thereof so as to energize the valve 40 closed. Inasmuch as the re-energization of relay S opens the circuit for supplying the additional heating current to auxiliary heater 58, the thermostat contact 60 will remain closed only momentarily and the thermostat will cycle or recurrently close and open its contact 60 until the temperature within the passenger space falls slightly more than 2° below the functional setting of said thermostat as established by the position of the rheostat arm 80.

We claim:

1. The combination with means for delivering cooled air into a closed passenger compartment of an automobile comprising a closed refrigerant path including an evaporator connected therein in heat exchange relation to air passed therethrough and into said passenger compartment, a motor driven compressor for withdrawing refrigerant from said evaporator and delivering it into a condenser, and an expansion valve interposed between said condenser and the evaporator for restricting the delivery of the compressed refrigerant to the evaporator, of control means for automatically regulating the temperature of air within said compartment, said control means comprising a normally open by-pass valve operatively connecting the condenser with the inlet side of the compressor so as to normally by-pass refrigerant around said expansion valve and evaporator, a solenoid operable upon energization thereof to close said valve, means including a thermostat responsive to a predetermined temperature within said compartment for closing an energizing circuit through said valve solenoid to close the valve, an electrical heater for applying auxiliary heat to said thermostat to adjust its temperature setting, an energizing circuit for said heater including a variable resistor for varying the amount of electrical current supplied to said heater to adjust the temperature setting of said thermostat, and a second electrical circuit effective upon the opening of the thermostat to direct additional electrical current to said heater to increase the heating effect thereof.

2. The combination with an automobile having a passenger compartment and means for supplying refrigerated air to said compartment comprising a closed refrigerant path including an evaporator arranged in heat exchange relation to the air supplied to said compartment, a motor driven compressor pump for withdrawing refrigerant from said evaporator and delivering it into a condenser, and an expansion valve for restricting the delivery of said compressed refrigerant to the evaporator, of control means for automatically varying the effectiveness of said evaporator to regulate the temperature of air within the compartment, said control means comprising a normally open solenoid-actuated by-pass valve operatively connecting the outlet of the condenser with the inlet side of the compressor so as to normally by-pass refrigerant around said expansion valve and evaporator, a solenoid for said valve operable upon energization thereof to close the valve, a normally open circuit for the solenoid, normally de-energized relay means operable upon energization thereof to close the solenoid circuit, and a thermostat disposed within the compartment and operable when a predetermined ambient temperature has been attained for energizing said relay means.

References Cited in the file of this patent

UNITED STATES PATENTS

| | | |
|---|---|---|
| 2,311,622 | Alexander | Feb. 25, 1943 |
| 2,394,708 | Masek | Feb. 12, 1946 |
| 2,401,004 | Lehane | May 28, 1946 |